L. W. BURRELL.
MOTOR VEHICLE.
APPLICATION FILED MAR. 31, 1913.
1,112,434.
Patented Oct. 6, 1914.
2 SHEETS—SHEET 1.
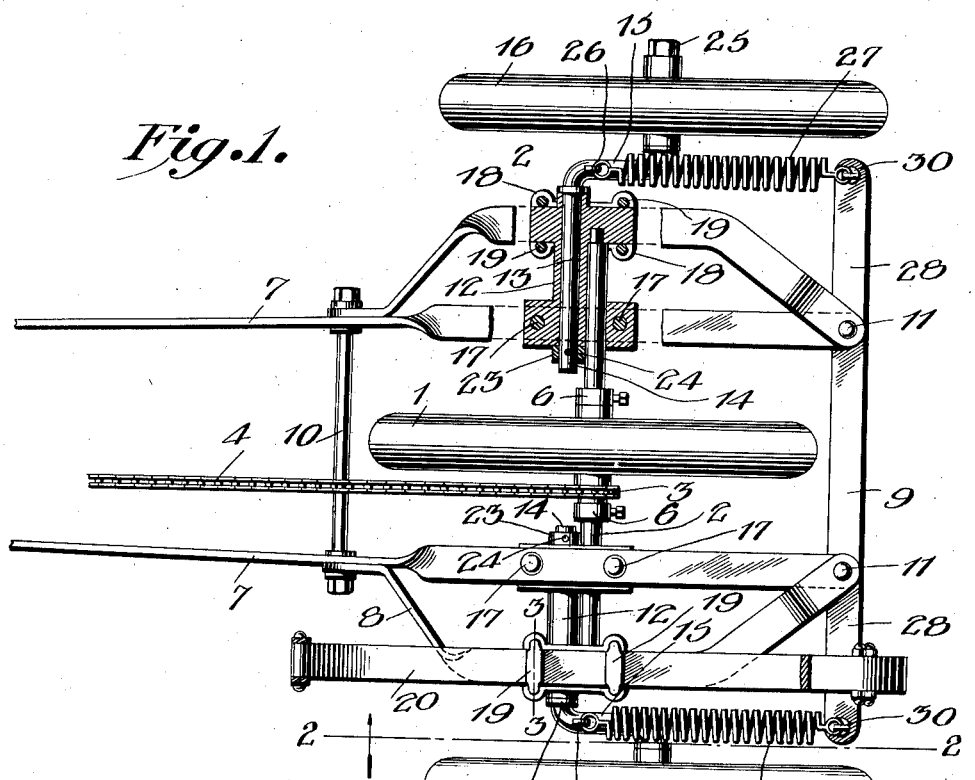
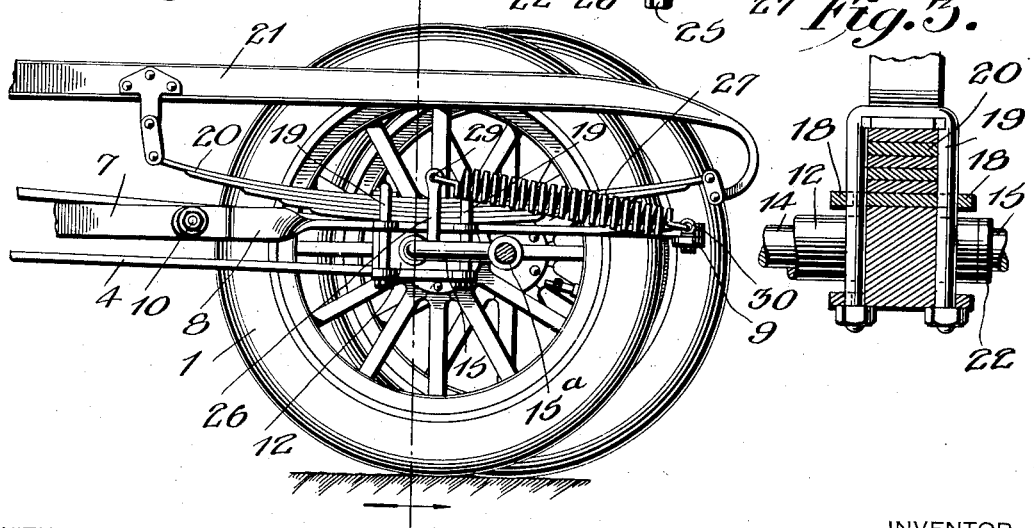
WITNESSES
INVENTOR
L. W. Burrell
BY
ATTORNEY

L. W. BURRELL.
MOTOR VEHICLE.
APPLICATION FILED MAR. 31, 1913.

1,112,434.

Patented Oct. 6, 1914.

2 SHEETS—SHEET 2.

WITNESSES

INVENTOR
L. W. Burrell
BY
ATTORNEY

UNITED STATES PATENT OFFICE.

LORY W. BURRELL, OF BRAINERD, MINNESOTA, ASSIGNOR TO ALBERT ANGEL, OF BRAINERD, MINNESOTA.

MOTOR-VEHICLE.

1,112,434.  Specification of Letters Patent.  Patented Oct. 6, 1914.

Application filed March 31, 1913. Serial No. 758,033.

*To all whom it may concern:*

Be it known that I, LORY W. BURRELL, a citizen of the United States, residing at Brainerd, in the county of Crow Wing and State of Minnesota, have invented a new and useful Motor-Vehicle, of which the following is a specification.

The invention relates to improvements in motor vehicles.

The object of the present invention is to improve the construction of motor vehicles, and to provide a simple and comparatively inexpensive motor vehicle running gear of light, strong and durable construction, having a single central traction wheel, and adapted to dispense with complicated and expensive differential gearing, and equipped with a pair of counterbalancing wheels, located at opposite sides of the central traction wheel and adapted to enable the same to travel over any and all conditions of ground surface.

A further object of the invention is to provide yieldably mounted counterbalancing wheels adapted to permit the central traction wheel to drop into depressions and ride over obstructions without affecting their position on the surface of the roadway, and capable also of independent movement, whereby one of the counterbalancing wheels may surmount an obstruction while the other is traveling in a rut.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 4:
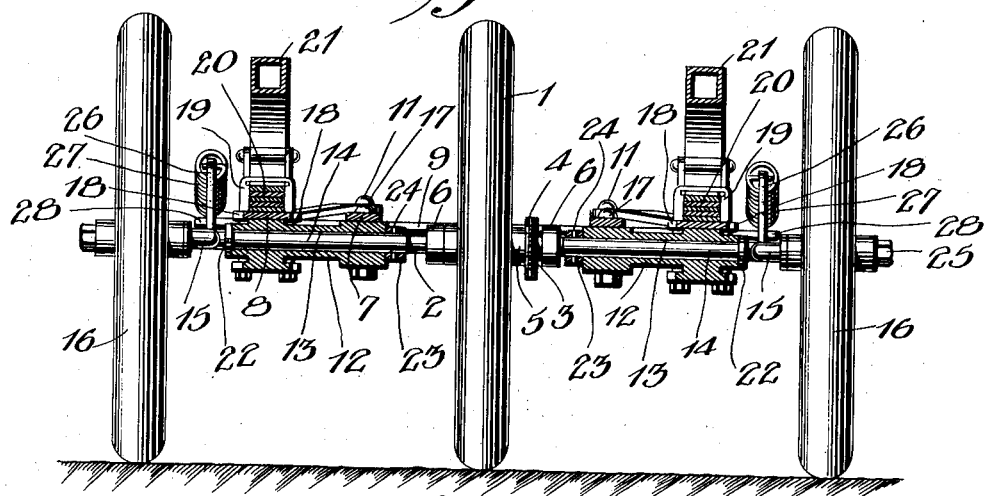
Figure 5:
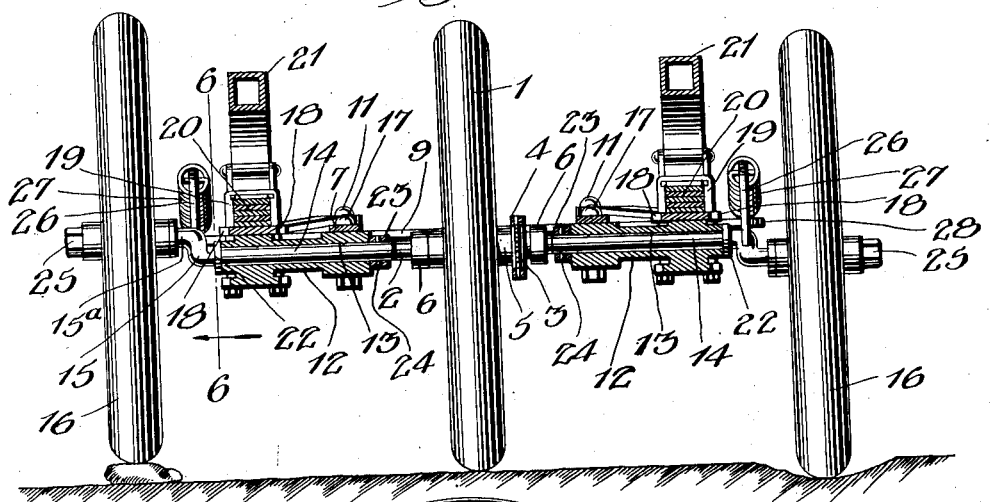
Figure 6:
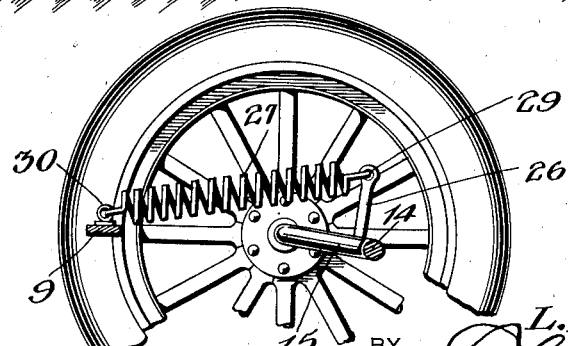

In the drawings:—Figure 1 is a plan view partly in section of the rear portion of a motor vehicle running gear, constructed in accordance with this invention. Fig. 2 is a longitudinal sectional view on the line 2—2 of Fig. 1. Fig. 3 is a detail sectional view, illustrating the manner of securing the body supporting springs and the axle to the frame of the running gear. Fig. 4 is a transverse sectional view on the line 4—4 of Fig. 2. Fig. 5 is a similar view, illustrating the independent action of the counterbalancing wheels. Fig. 6 is a vertical sectional view on the line 6—6 of Fig. 5.

Like numerals of reference designate corresponding parts in all the figures of the drawings.

In the accompanying drawings in which is illustrated the preferred embodiment of the invention, 1 designates a central pneumatically tired traction wheel, designed to be arranged at the rear portion of the running gear frame of a motor vehicle of any character and mounted on a relatively fixed rear axle 2, and equipped at its hub with a sprocket wheel 3 meshing with a sprocket chain 4, which connects the traction wheel with the engine (not shown) of the motor vehicle. The traction wheel may be of any desired construction and any other form of gearing may be employed for transmitting motion from the engine or motor to the traction wheel. The sprocket wheel 3 may be mounted on an extension 5 of the hub of the traction wheel, as illustrated in the accompanying drawings, or it may be connected with the traction wheel in any other suitable manner, and set collars 6 are secured to the axle 2 at opposite sides of the traction wheel to maintain the same in a central position on the axle.

Only the rear portion of the running gear frame is illustrated in the accompanying drawings, and, as shown, it consists of longitudinal reach bars 7, rear side braces 8, a rear transverse connecting bar 9 and a transverse rod 10, located in advance of the rear axle and piercing the front ends of the braces and the adjacent portions of the reach bars 7, as clearly illustrated in Fig. 1 of the drawings. The side braces are bowed outwardly, and their front terminals are secured to the reach bars by the said rod 10, and their rear terminals are fastened to the rear ends of the reach bars and to the rear transverse bar 9 by bolts 11, or other suitable fastening devices. The terminal portions of the rear axle 2 are equipped with bearing sleeves 12, provided with openings for the reception of the rear axle and having alined bearing openings 13 for the reception of inner spindle or pivot portions of axle sections 14, having outer cranks 15 and receiving on their spindle portions 15ª counterbalancing wheels 16. The sleeves 13, which may be constructed in any suitable manner, are secured at their inner ends to the reach bars by bolts 17, and they are provided at their outer portions with ears 18, arranged in pairs and receiving U-bolts 19, which secure the sleeves and body supporting springs 20 to the outwardly bowed side bars or braces 8 of the frame of the running gear. The springs 20, which may be of any preferred form to suit the character of motor vehicle, are mounted directly over the rear axle, and they are designed to be connected with longitudinal bars or members 21 of the body (not shown) in the usual manner, as illustrated in Fig. 2 of the drawings.

The crank axle sections are provided at their inner transverse bearing portions with fixed collars 22, which are arranged at the outer ends of the sleeves, and the axle sections are secured in the sleeves by means of detachable collars 23, arranged on the inner ends of the axle sections and secured to the same by pins 24, or other suitable fastening devices. The counterbalancing wheels 16, which are shown in the drawings as pneumatically tired, may be of any suitable construction, and they are secured on the outer spindle portions of the crank axle sections by suitable axle nuts 25. The crank axle sections, which are independently movable, have their cranks extending rearwardly from their inner transverse portions, and they are provided at the inner ends of the cranks with upwardly extending arms 26, arranged at right angles to the cranks and having connected to them the front ends of a pair of longitudinally disposed coiled springs 27, which are secured at their rear ends to the terminals of the rear transverse bar or member 9 of the frame of the running gear. The transverse bar or member 9 projects laterally at each side of the frame of the running gear to form fixed arms 28, and its terminals are in substantial alinement with the inner ends of the cranks of the axle sections. The arms 26, which are vertical when the cranks are in a horizontal position, as shown in Fig. 2 of the drawings, are provided at their upper ends with openings 29 into which the front ends of the coiled springs are linked, and the rear ends of the latter are linked into openings 30 of the laterally extending arms 28 of the running gear frame. The coiled springs yieldably maintain the counterbalancing wheels in contact with the supporting surface, and they may be of any desired type and strength to secure the necessary counterbalancing action to maintain the motor vehicle to which they are applied in an upright position.

The weight of the motor vehicle is sustained by the central traction wheel at all times, and the tractive force is not affected by the counterbalancing action of the side wheels. The independently movable counterbalancing side wheels permit the central traction wheel to ride in ruts and to pass over obstructions without affecting their position on the surface of the roadway, and their independent movement also enables the traction wheels to adapt themselves to the character of the roadway without affecting the action of the central traction wheel, as for instance, one of the counterbalancing side wheels may be traveling in a rut and the other riding over an obstruction while the central traction wheel is running on a level surface. The yieldably mounted counterbalancing wheels enable the central traction wheel to travel over any character of road surface, and they also enable a rectangular vehicle body to be employed and do not require any change or alteration in the construction of the latter to suit the central support afforded by the traction wheel, which is adapted to dispense with the differential gearing and other complicated and expensive mechanism incident to the employment of a pair of side traction wheels. In practice, the counterbalancing side wheels will be arranged to track with the front wheels similar to the wheels of an ordinary vehicle.

What I claim is:—

1. A motor vehicle including a running gear frame, bearings secured to the running gear frame at opposite sides thereof, a transverse axle mounted in the said bearings, spaced side crank axle sections journaled in the said bearings, a central traction wheel mounted on the axle and supporting the running gear frame, counterbalancing wheels of the same diameter as the central traction wheel and mounted on the crank axle sections, and springs connected with the latter and with the running gear frame for maintaining the counterbalancing wheels in constant contact with the supporting surface and adapted to permit the side wheels to yield to irregularities thereof.

2. A motor vehicle including a running gear frame, a central traction wheel mounted on the running gear frame and subjected to the weight of the vehicle, a pair of spaced independently movable crank axle sections located at opposite sides of the central traction wheel and having inner and outer transversely disposed spindle portions, the inner spindle portions being journaled on the running gear frame, counterbalancing wheels mounted on the outer spindle portions of the crank axle sections, and springs connected with the crank axle sections and yieldably maintaining the counterbalancing wheels in constant contact with the supporting surface.

3. A motor vehicle including a running gear frame, a central traction wheel supporting the running gear frame, spaced crank axle sections mounted on the running gear at opposite sides of the central wheel and provided with cranks and having arms rigid with and arranged at an angle to the cranks, counterbalancing wheels mounted on the said cranks, and springs connected with the said arms for yieldably maintaining the counterbalancing wheels in constant contact with the supporting surface.

4. A motor vehicle including a running gear frame, a transverse axle secured to the frame, a central traction wheel mounted on the axle and subjected to the weight of the motor vehicle, spaced crank axle sections journaled on the running gear at opposite sides of the central traction wheel in substantially the horizontal plane of the axis thereof and having independent movement, counterbalancing wheels mounted on the crank axle sections, and means connected with the crank axle sections for yieldably maintaining the counterbalancing wheels in constant contact with the supporting surface, whereby the motor vehicle is balanced on the central traction wheel and is maintained in an upright position.

5. A motor vehicle including a running gear frame, a central traction wheel supporting the running gear frame, spaced crank axles mounted on the running gear frame in substantially the same horizontal plane as the axis of the central traction wheel, said crank axle sections being movable independently of each other and having rearwardly extending cranks, counterbalancing wheels arranged on the said cranks, and means connected with the crank axle sections for yieldably maintaining the counterbalancing wheels in constant contact with the supporting surface.

6. A motor vehicle including a running gear frame, a central traction wheel supporting the running gear frame, spaced crank axle sections mounted on the running gear frame for independent movement and having rearwardly extending cranks provided with substantially vertical arms rigid with the said cranks, counterbalancing wheels mounted on the cranks, and coiled springs connected at their front ends with the said arms and extending rearwardly therefrom and connected at their rear ends to relatively fixed portions of the motor vehicle and adapted to maintain the counterbalancing wheels in constant contact with the supporting surface.

7. A motor vehicle including a frame having fixed laterally projecting arms, an axle secured to the frame, a central traction wheel mounted on the axle and supporting the weight of the motor vehicle, spaced crank axle sections journaled on the said frame for independent movement and having cranks at their outer portions and provided with arms rigid with and arranged at an angle to the cranks, counterbalancing side wheels mounted on the said cranks, and springs connected with the arms of the crank axle sections and with the laterally extending arms of the frame to maintain the counterbalancing wheels in constant contact with the ground.

8. A motor vehicle including a frame, an axle extending across the frame, sleeves rigidly secured to the frame and receiving the terminal portions of the crank axle, a central traction wheel mounted on the axle, spaced crank axle sections journaled in the sleeves in substantially the horizontal plane of the axle, counterbalancing wheels mounted on the crank axle sections, and means connected with the crank axle sections for yieldably maintaining the counterbalancing wheels in constant contact with the supporting surface.

In testimony that I claim the foregoing as my own, I have hereto affixed my signature in the presence of two witnesses.

LORY W. BURRELL.

Witnesses:
 GEO. A. KEENE,
 G. W. CHADBOURNE.